United States Patent [19]

Conley

[11]  4,002,487

[45]  Jan. 11, 1977

[54] PROCESS FOR BLEACHING KAOLIN

[75] Inventor: Robert F. Conley, Scotch Plains, N.J.

[73] Assignee: IMC Chemical Group, Terre Haute, Ind.

[22] Filed: May 13, 1976

[21] Appl. No.: 685,850

[52] U.S. Cl. .............................. 106/288 B; 106/72; 106/309

[51] Int. Cl.$^2$ ................... C04B 33/04; C04B 33/13

[58] Field of Search .................. 106/288 B, 72, 309

[56] References Cited

UNITED STATES PATENTS

| | | | |
|---|---|---|---|
| 3,309,211 | 3/1967 | Weiss et al. | 106/72 |
| 3,398,008 | 8/1968 | Jacobs et al. | 106/72 |
| 3,861,934 | 1/1975 | Mallary et al. | 106/288 B |

*Primary Examiner*—Patrick P. Garvin
*Assistant Examiner*—J. V. Howard
*Attorney, Agent, or Firm*—Robert H. Dewey; Howard E. Post

[57] ABSTRACT

In a process for treating raw kaolin clay to improve the color and brightness by treating the clay in an aqueous dispersion with sodium dithionite, the improvement consisting of treating the dispersion with hydroxylamine or salt thereof after the treatment with sodium dithionite is complete.

4 Claims, No Drawings

PROCESS FOR BLEACHING KAOLIN

BACKGROUND OF THE INVENTION

This invention relates to a process for bleaching, i.e. improving the color properties of, kaolin clay. In a particular aspect this invention relates to an improved process for bleaching kaolin wherein sodium dithionite is used as the bleaching agent.

Large amounts of kaolin clay are used by the paper industry for paper coatings. A very white, bright product is essential in this use, but raw kaolin as it is mined usually has a brightness of 75-80 compared with standard magnesium oxide taken as 100. By use of particle size segregation and bleaching, this brightness can be improved to 85-90 or even above. The primary sources of color in kaolins are hydrated iron oxides, ilmenite, substituted iron, tourmaline and micas. A common method of improving brightness is to treat the clay with a bleaching agent. Sodium dithionite (also known as sodium hydrosulfite, $Na_2S_2O_4$) is widely used for this purpose. Of the primary color sources, only the hydrated iron oxides are affected to any extent by chemical bleaching procedures.

According to the prior process, kaolin is slurried in water to provide about 20-25% solids. The pH is adjusted to about 3-4 or 4.5 with, for example, sulfuric acid and the sodium dithionite (also known as sodium hydrosulfite, $Na_2S_2O_4$) is added to the slurry at about 2-15 lb/ton of clay. The ferric iron, which is in solid form, is thereby reduced to the ferrous state and becomes solubilized in the process so that it can be separated from the clay by washing.

This process has given good results but it suffers from two disadvantages. The sodium dithionite is unstable in acid solution so a large excess is required for the bleaching step and even so, it is effective for only about an hour. As the dithionite becomes exhausted, aerobic oxygen again slowly re-oxidizes the remaining iron, so that at least some of the effectiveness of the dithionite is lost. The reoxidation reaction is generally known in the industry as "reversion."

Accordingly there is a need for an improved process for preventing reversion.

SUMMARY OF THE INVENTION

It is an object of this invention to provide an improved process for bleaching kaolin.

It is another object of this invention to provide an improvement in the process of bleaching clay using sodium dithionite.

Other objects of this invention will be apparent to those skilled in the art from the disclosure herein.

It is the discovery of this invention to provide an improvement in the process of bleaching kaolin clay using sodium dithionite whereby hydroxylamine, or a salt thereof, is added to the clay after the bleaching step is complete, thereby substantially preventing reversion.

DETAILED DISCUSSION

In accordance with the prior process, the kaolin is bleached with sodium dithionite in the usual amounts and under the usual conditions, e.g. at pH 3-4. The treated clay is then washed and filtered. It is then customary to resuspend the clay in water to form a slurry, which can be sold or used as such, or the slurry can be spray-dried, or it can be acid-flocculated, filtered and dried. These steps are all well-known in the prior art and are not considered to be a part of the invention.

According to the present invention, hydroxylamine, or a salt thereof, preferably the acid sulfate, is added to the bleached clay slurry about an hour after the bleaching process is complete, but no later than 5 hours, and preferably, but not necessarily, prior to filtration. The hydroxylammonium acid sulfate hereinafter designated HAS is conveniently, but not necessarily dissolved in water prior to addition to the clay. The concentration of HAS is not critical. It can be dissolved in sufficient water to provide from 1% to 50-60% or more HAS as preferred.

The amount of HAS to be used varies with the degree of color of the starting kaolin and the quality of clay product desired, generally from about 0.1 to 2.0 lb or more per ton of clay depending on the quality of the clay and the intended use. However it is not intended that the invention be limited to any particular proportion of HAS. For example, for premium coating grade clay, i.e. higher brightness, about 1 pound of HAS should be used per ton of clay of average quality. However for standard coating grade, 0.5 pound per ton is usually sufficient. In some instances, however, it may be advisable to use up to 1.5 to 2.0 lb per ton.

After the HAS has been added, the reversion is halted and the clay can be processed as usual.

The HAS is most effective at a pH below 4.5, but it can be used at the higher pH range of the predispersed slurries if necessary. A pH below 4.5 is consistent with that of the dithionite bleaching step; the free acidity present in the HAS is generally sufficient to provide the preferred pH.

The use of HAS to treat clay during processing has several advantages. Reoxidation color is prevented for as long as 7-10 days and if the clay is filtered and washed after treatment, the iron content is considerably reduced, an important factor in many uses. If iron is not solubilized and removed, it can, in turn, accelerate the depolymerization of phosphate dispersants and detrimentally increase the viscosity of the slurry. Also, it is estimated that 2-5 lb excess dithionite are required for retarding reversion during processing, so the use of HAS eliminates the need for this excess dithionite. A further advantage is that HAS has little or no adverse affect on rheological properties at the predispersion pH.

The HAS preferred for the practice of this invention is commercially available and the usual commercial grade is satisfactory. It is available both in flaked form and as a liquid with excess sulfuric acid and water. Any source of hydroxylamine, such as the neutral sulfate or chloride salts, is the practical equivalent of HAS when used at pH 4.5 or below, and can be used in equi-molar amounts. It is not intended that the practice of this invention be limited to HAS alone.

The invention will be better understood with reference to the following examples. It is understood that the examples are intended only for illustration and it is not intended that the invention be limited thereby.

EXAMPLE 1

A ton of kaolin clay is slurried in 900 gallons of water. The pH is adjusted to about 3.5 with sulfuric acid and 5 lbs of sodium dithionite is added and mixed well with the slurry. The mixture is allowed to stand for about 40 minutes at which time the bleaching is considered to be complete. The mixture is allowed to stand for 1 additional hour at which time 0.5 lb of hydroxylammonium acid sulfate dissolved in 0.5 gal. of water is added with agitation. The pH is below 4.5. The clay mixture is then filtered and the filtered clay is washed with an equal volume of water. The washed clay is then dispersed in about 100 gal. of water to which is added about 6 lb of sodium pyrophosphate as a dispersing agent. There is obtained a 70% slurry which is deemed useful as a paper coating. When tested for brightness by a known procedure, a brightness reading of 85 is obtained.

EXAMPLE 2

The experiment of Example 1 is repeated in all essential details except that 1 lb of HAS is used in place of 0.5 lb. The resulting clay, when dried, is of premium quality color and brightness.

I claim:
1. In a process for treating raw kaolin clay to improve the color and brightness by bleaching the clay in an aqueous dispersion with sodium dithionite, the improvement consisting of treating the dispersion with hydroxylamine or salt thereof within about 1 to 5 hours after the treatment with sodium dithionite is complete.
2. The improvement of claim 1 wherein the hydroxylamine is in the form of hydroxylammonium acid sulfate and is used in a proportion of from about 0.1 to about 2.0 lb per ton of clay.
3. The improvement of claim 2 wherein the hydroxylammonium acid sulfate is used at a pH below about 4.5.
4. The improvement of claim 3 wherein the hydroxylammonium sulfate is used in a proportion of about 0.5 to 1 lb per ton of clay.

* * * * *